(12) United States Patent
Oechsner

(10) Patent No.: US 10,191,767 B2
(45) Date of Patent: Jan. 29, 2019

(54) SEAMLES SDN-SUPPORTED RAN-APP MIGRATION

(71) Applicant: NEC EUROPE LTD., Heidelberg (DE)

(72) Inventor: Simon Oechsner, The Hague (NL)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/549,173

(22) PCT Filed: Nov. 20, 2015

(86) PCT No.: PCT/EP2015/077290
§ 371 (c)(1),
(2) Date: Aug. 7, 2017

(87) PCT Pub. No.: WO2017/084726
PCT Pub. Date: May 26, 2017

(65) Prior Publication Data
US 2018/0095787 A1 Apr. 5, 2018

(51) Int. Cl.
*G06F 9/48* (2006.01)
*G06F 9/455* (2018.01)
(Continued)

(52) U.S. Cl.
CPC ........ *G06F 9/4856* (2013.01); *G06F 9/45558* (2013.01); *H04W 28/0247* (2013.01);
(Continued)

(58) Field of Classification Search
CPC ........... H04W 88/085; H04W 28/0247; H04W 28/08; H04W 36/0033; H04W 36/22;
(Continued)

(56) References Cited

U.S. PATENT DOCUMENTS 8,725,079 B2 * 5/2014 Wang Helmersson ......................
H04W 16/18
455/501
9,363,850 B2 * 6/2016 Johansson ........... H04W 88/085
(Continued)

FOREIGN PATENT DOCUMENTS

EP 1657862 A1 * 5/2006 ............ H04W 28/02
EP 2315119 A1 4/2011

OTHER PUBLICATIONS

"C-RAN the Road Towards Green RAN v2.5", China Mobile Research Institute, Oct. 2011 (Oct. 2011), XP002759032.
(Continued)

*Primary Examiner* — Ninos Donabed
(74) *Attorney, Agent, or Firm* — Leydig, Voit & Mayer, Ltd.

(57) ABSTRACT

A method for performing centralized radio access network (CRAN) process migration, wherein the CRAN comprises a number of remote radio access points and a centralized processing center including a number of physical compute hosts that perform at least part of a radio access network functionality, includes executing a CRAN process on a first of the physical compute hosts and starting a new instance of the CRAN process on a second of the physical compute hosts; duplicating traffic destined to the CRAN process to both instances of the CRAN process; during a first time interval, processing the traffic on the first and the second physical compute host in parallel and suppressing the output of the second physical compute host; and when the second physical compute host reaches a same state with respect to the CRAN process as the first physical compute host, forwarding duplicate outputs from both instances to higher layers.

15 Claims, 3 Drawing Sheets

(51) Int. Cl.
    *H04W 28/02* (2009.01)
    *H04W 36/22* (2009.01)
    *H04W 28/08* (2009.01)
    *H04W 36/00* (2009.01)
    *H04L 12/715* (2013.01)

(52) U.S. Cl.
    CPC ....... *H04W 28/08* (2013.01); *H04W 36/0033* (2013.01); *H04W 36/22* (2013.01); *G06F 2009/4557* (2013.01); *G06F 2009/45562* (2013.01); *G06F 2009/45583* (2013.01); *H04L 45/64* (2013.01)

(58) Field of Classification Search
    CPC ....... H04L 69/08; H04L 69/323; H04L 45/64; G06F 2009/45562; G06F 2009/4557; G06F 2009/45583; G06F 9/45558; G06F 9/4856
    See application file for complete search history.

(56) References Cited

U.S. PATENT DOCUMENTS

| | | | | |
|---|---|---|---|---|
| 9,706,522 | B2* | 7/2017 | Etemad | H04W 36/14 |
| 2007/0147287 | A1* | 6/2007 | Jalil | H04W 16/06 |
| | | | | 370/329 |
| 2012/0137287 | A1 | 5/2012 | Pang et al. | |
| 2012/0182859 | A1* | 7/2012 | Ikeda | H04L 1/1835 |
| | | | | 370/216 |
| 2012/0315935 | A1* | 12/2012 | Wang Helmersson | H04W 16/18 |
| | | | | 455/501 |
| 2013/0136068 | A1* | 5/2013 | Johansson | H04W 88/085 |
| | | | | 370/329 |
| 2014/0286159 | A1* | 9/2014 | Etemad | H04W 36/14 |
| | | | | 370/230 |
| 2015/0052323 | A1 | 2/2015 | Noel et al. | |
| 2015/0309818 | A1 | 10/2015 | Lee et al. | |
| 2016/0242147 | A1* | 8/2016 | Tarlazzi | H04W 72/042 |

OTHER PUBLICATIONS

P. Rost, C.J. Bernardos, A. De Domencio, M. Di Girolamo, M. Lalam, A. Maeder, D. Sabella, D. Wübben: "Cloud Technologies for Flexible 5G Radio Access Networks", IEEE Communications Magazine, vol. 52, No. 5, May 2014 (May 2014), XP002759033.

"Suggestions on Potential Solutions to C-RAN by NGMN Alliance", NGMN Alliance, Jan. 3, 2013 (Jan. 3, 2013), XP002759072.

"C-RAN", Wikipedia, Nov. 18, 2015 (Nov. 18, 2015), XP002759077.

* cited by examiner

SEAMLES SDN-SUPPORTED RAN-APP MIGRATION

CROSS REFERENCE TO RELATED APPLICATIONS

This application is a U.S. National Stage Application under 35 U.S.C. § 371 of International Application No. PCT/EP2015/077290 filed on Nov. 20, 2015. The International Application was published in English on May 26, 2017 as WO 2017/084726 A1 under PCT Article 21(2).

FIELD

The present invention generally relates to a method for performing CRAN process migration in a centralized radio access network, CRAN. Furthermore, the present invention relates to centralized radio access network, CRAN.

BACKGROUND

Future radio access networks (RANs) are going to be more centralized than today's RANs, at least partly, i.e. radio access points only perform part of the RAN protocol stack while the main part is performed centrally (see FIG. 1). This implies that a remote radio access point only performs part of Layer 1-3 of the RAN functionality while the remaining functionality is performed at a central processor. This central processor may be a virtual BS pool executed on top of a cloud-computing platform, as described, e.g., in "C-RAN The Road Towards Green RAN", White Paper v2.5, October 2011, CMCC, or in P. Rost, C. J. Bernardos, A. De Domenico, M. Di Girolamo, M. Lalam, A. Maeder, D. Sabella, and D. Wübben, "Cloud technologies for flexible 5G radio access networks", IEEE Communications Magazine, vol. 52, no. 5, May 2014.

The considered data rates in a centralized RAN (CRAN) environment may vary significantly depending on the underlying functional split and parameterization. For 100 base stations, the expected traffic may range from a few 100 Gbps in the case of a very low-layer centralization, to a few 10 Gbps for user-based centralization, and a few Gbps for Layer-2 centralization. Latency requirements will range from a few 100 microseconds in the case of lower-layer splits to a few milliseconds in the case of user-based centralization and Layer-2 centralization.

SUMMARY

In an embodiment, the present invention provides a method for performing centralized radio access network (CRAN) process migration in a CRAN, wherein the CRAN comprises a number of remote radio access points and a centralized processing center including a number of physical compute hosts that perform at least part of a radio access network (RAN) functionality. The method includes executing a CRAN process on a first of the physical compute hosts and starting a new instance of the CRAN process on a second of the physical compute hosts; duplicating traffic destined to the CRAN process to both instances of the CRAN process; during a first time interval, processing the traffic on the first and the second physical compute host in parallel and suppressing the output of the second physical compute host; and when the second physical compute host reaches a same state with respect to the CRAN process as the first physical compute host, forwarding duplicate outputs from both instances to higher layers.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
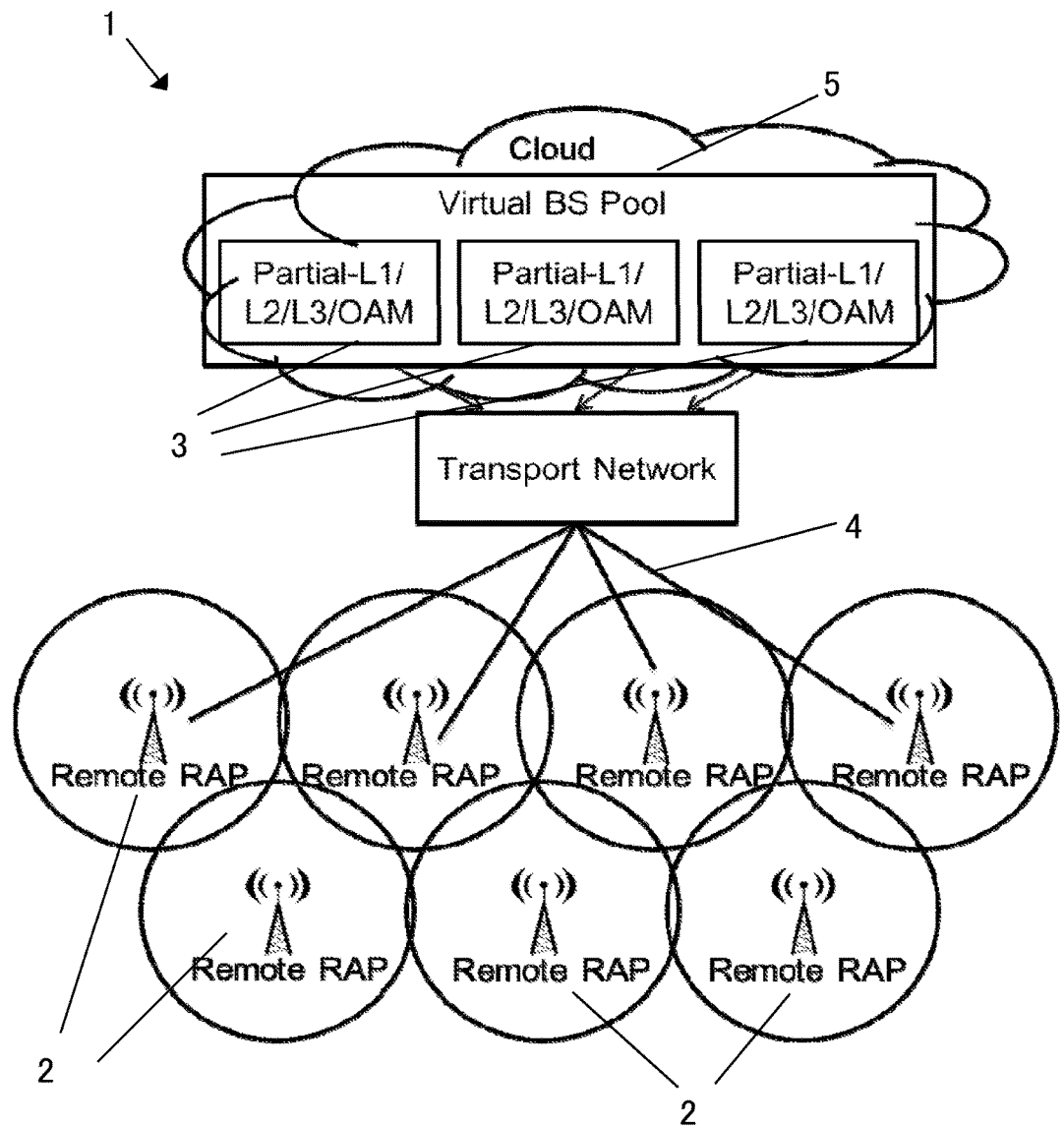
FIG. 1 is a schematic view illustrating the basic principle of a Cloud-RAN architecture.

The present invention generally relates to a method for performing CRAN process migration in a centralized radio access network, CRAN, wherein said CRAN comprises a number of remote radio access points and a centralized processing center including a number of physical compute hosts that perform at least part of the RAN functionality. Furthermore, the present invention relates to centralized radio access network, CRAN, comprising a number of remote radio access points, and a centralized processing center including a number of physical compute hosts configured to perform at least part of the RAN functionality.

Embodiments of the present invention can address the migration of RAN-Apps, i.e., software instances which perform all centralized RAN functionality for an individual user terminal. One of the value propositions of CRAN is that the processing, e.g., encoding and decoding, for a user can be done in data centers, thus reaping the benefits of economy of scale and workload consolidation offered by virtualization. However, these advantages of data center processing can only be fully exploited if instances in the data center can be freely migrated as requested by optimization algorithms. Reasons for triggering the migration of user processing can be typical operations within a virtualized environment, for example, to improve resource utilization, to switch off idle physical hosts, or to reduce network traffic. In addition, it may be necessary in order to improve latency or other service quality parameters, e.g., by placing the RAN-App function closer to the base station or on a better network path for the service chain. Another reason would be to co-locate RAN-Apps for users that are in the same cell and physically close to each other, in order to exploit co-processing opportunities in the decoding function.

Since the timing constraints in the RAN context are very tight, such a migration needs to be done fast. Conventional VM (Virtual Machine) migration approaches are based on a 'break-before-make' approach, i.e., while the new instance is prepared in the background, the actual switch from the old to the new instance typically means that the old instance is suspended for a short amount of time, the new one is activated and the network is advised of the new route traffic needs to take, meaning a short window without connectivity. While this can happen fast enough in conventional virtualized environments (i.e. on the basis of a sub-second timeframe under good network conditions), it might not be fast enough for CRAN, where a millisecond timeframe applies. In any case this delay has a lower bound in terms of the signaling delay between old and new instance.

Embodiments of the present invention provide a method for performing CRAN process migration in a centralized radio access network, CRAN, and a centralized radio access network of the above mentioned kind in such a way that CRAN process migration can be performed in a more seamless fashion.

According to an embodiment, the invention provides a method that includes executing a CRAN process on a first of said physical compute hosts and starting anew instance of said CRAN process on a second of said physical compute hosts, duplicating traffic destined to said CRAN process to both instances of said CRAN process, during a first time interval, processing the traffic on said first and said second physical compute host in parallel and suppressing the output of said second physical compute host, when said second physical compute host reaches the same state with respect to said CRAN process as said first physical compute host, forwarding duplicate outputs from both instances to higher layers.

According to an embodiment, a centralized radio access network includes a CRAN process scheduler component that is configured to start, while a CRAN process is being executed on a first of said physical compute hosts, a new instance of said CRAN process on a second of said physical compute hosts and to trigger duplication of traffic destined to said CRAN process to both instances of said CRAN process, wherein said first and said second physical compute host are configured to process the received traffic in parallel and to suppress the output of said second physical compute host during a first time interval, and to forward duplicate outputs from both instances to higher layers, when said second physical compute host reaches the same state with respect to said CRAN process as said first physical compute host.

Seamless migration of CRAN processing can be achieved by running a second instance of a particular CRAN process in parallel to the original CRAN process, on a different physical compute host, and by utilizing traffic duplication. In addition, the present invention implements a time interval that can be regarded as a warm-up phase during which the second instance will reach the same state with respect to the CRAN process like the original first instance. As a result, the invention enables providing RAN processing migration seamlessly rather than interrupting service for a short interval, thus making it transparent from the viewpoint of the end user connection. The invention can be most suitably applied for migrating functions with short memory, such as RAN processing, in particular decoding/encoding applications having per se short state memory.

Embodiments of the present invention also circumvent the issue that the installation and activation of SDN rules on networking elements cannot be timed exactly, due to the network loop between SDN controller and networking element and lack of control over the processing on the network element itself. In other words, the practical issue of not having perfect control of when forwarding rules are becoming active on network elements is circumvented.

It should be noted that applications of the present invention are not limited to RAN processing. Generally, as will be appreciated by those skilled in the art, the present invention can also be applied in similar technical fields, in particular in cases where the connection endpoint is either stateless or has a short memory (like the remote radio access points, RAPs, in CRAN applications) and where the responses of the duplicated function/application are identical after a warm-up phase.

According to a preferred embodiment the CRAN process may not necessarily include a complete instance in the sense of a virtual machine (VM), but might be on a finer granularity level. For instance, the CRAN process may include a dedicated software instance, e.g. in form of a processing thread and/or function of an individual user, in particular a user decoding and/or encoding functionality. Generally, hereinafter a CRAN process will be sometimes briefly referred to as 'RAN-App'.

According to a preferred embodiment the new instance of the CRAN process, upon being started, may be initialized with a basic configuration. This basic configuration may include, for instance, the definition of channel characteristics.

According to a preferred embodiment the first time interval may be defined based on the employed RAN protocol, frame duration and/or SDN rule installation time, or may be derived from the use-case domain (e.g. RAN-Apps or video transcoding). According to an embodiment the length of the time interval may be configured by the respective RAN-Apps themselves utilizing the available domain-specific knowledge. Alternatively, the output of both instances may be routed via an additional entity, which is able to identify associated pairs of packets and can verify that the produced output is indeed the same. This entity can then decide to terminate the first time interval.

According to a preferred embodiment the second physical compute host may operate with an enhanced error tolerance during the first time interval after starting the new instance of the CRAN process. In other words, during the warm-up phase errors caused by missing state on the second physical compute host may be handled in more liberal fashion compared to normal operation.

According to a preferred embodiment the duplicate outputs from both instances may be resolved at higher layers by means of applying well-known packet de-duplication techniques.

According to a preferred embodiment the forwarding of the output of the instance of the CRAN process executed on the first physical compute host to higher layers is stopped after a second defined time interval following the first time interval. In particular, it may be provided that the instance of the CRAN process executed on the first physical compute host is shut down after this second defined time.

According to a preferred embodiment the length of the second time interval may be determined based on an estimated time duration required for updating forwarding rules on network elements involved in forwarding traffic to be processed by the first and the second physical compute host. Generally, by using phases with parallel processing as described here, the problem of lack of control over the exact activation of traffic rerouting is circumvented. Thus, a switch to the new instance is enabled without having to interrupt the service, in contrast to the state of the art in VM migration.

According to a preferred embodiment the duplicating of traffic destined to the CRAN process is achieved by means of Software Defined Networking, SDN, rules on a network element on the path from the traffic source towards the first physical compute host. It may be provided that a CRAN process migration procedure is triggered by a CRAN process scheduler component that is in charge of placing CRAN processes on physical compute hosts. An SDN controller, upon receiving a trigger message from a CRAN process scheduler component, may then install new forwarding rules on all switches on the path between the switch where the path from the RAN to the first physical compute host diverges from the path from the RAN to the second physical compute host.

FIG. 1 is a schematic view illustrating a possible option of a centralized CRAN architecture as currently being considered, in which embodiments of the present invention can be suitably applied. As shown in FIG. 1, in the CRAN architecture, generally denoted by reference numeral 1, a functional split of the base station functionality is realized between distributed access points and a centralized access controller. More specifically, the access points (according to conventional prior art terminology that to some extent depends on the degree of centralization, also denoted as radio function units, remote radio heads, RRH, or remote radio access points, RAP, 2) are separated from the base station's access controller 3, also referred to as digital function unit or baseband unit (BBU), with a backhaul link 4 between RAPs 2 and access controller 3. The advent of centralized-RAN technology enables the potential to have centralized processing of data.

According to the aforesaid, in a centralized radio access network (CRAN), base station processing is centralized at a processing center 5. This (centralized) processing center 5 performs part or all of the processing which is traditionally performed at the (remote) base stations, i.e. analog-to-digital conversion (in the case of "Radio over Fiber") and digital base band processing ("Remote Radio Head"), see for reference C. Chen and J. Huang, "Suggestions on potential solutions to C-RAN by NGMN alliance," NGMN Alliance, Tech. Rep., January 2013.

CRAN systems may either run on dedicated hardware (so called baseband pools) which deploys the same processing architecture as base stations, or they run on commodity hardware where standardized IT hardware is deployed. In both cases, but particularly in the latter case, a virtualized environment can be provided such that base stations run in virtual machines where each virtual machine receives access to part of the data center resources. The actual amount of resources which is provided may not be revealed to the virtual machine, but only a virtualized representation. The major advantage of deploying virtual machines lies in the fact that load fluctuations (in terms of processing load) can be balanced across multiple base stations and across time.

However, in a virtualized environment, it may be required under certain circumstances to re-assign certain process (or even whole base stations) to another virtual machine or at least to another physical compute host. The main reasons for moving base station processing between different virtual machines or different physical compute hosts include maintenance of hardware and/or software as well as excess of maximum resource occupation.

In view of the above, embodiments of the present invention can migrate states between instances by priming a newly instantiated, stateless function or function with limited and well-known state memory via duplicated input for a defined amount of time. This time may be derived from the use-case domain, e.g., RAN-Apps or video transcoding. For the use-case of RAN-Apps, a duplicate of user traffic to be encoded/decoded is sent to a new, separate RAN-App instance to bring it to same state as an existing one, exploiting the short state memory of decoding/encoding applications (in contrast to sending traffic twice or more times with possibly different encodings to the same endpoint as in the case of soft/softer handover).

Figure 2:
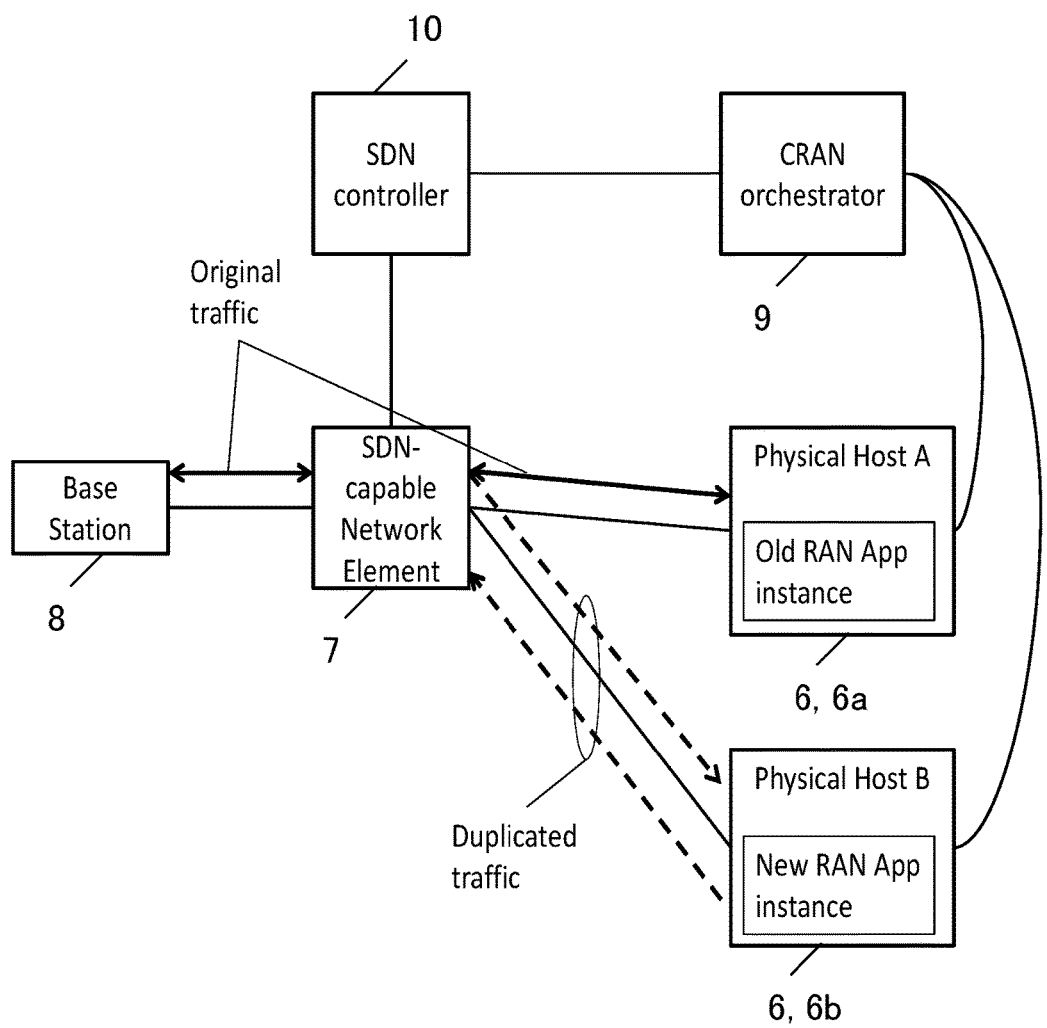
FIG. 2 is a schematic view illustrating RAN App migration in accordance with an embodiment of the present invention.

FIG. 2 is a schematic view illustrating a method for seamless RAN App migration in accordance with an embodiment of the present invention. In general terms, according to this embodiment seamless migration of CRAN processing is achieved by utilizing inbound traffic duplication by means of SDN rules on network devices and guard intervals for the data flows in order to start processing in a defined state on the node that is migrated to. In addition, a warm-up phase is implemented in the RAN application logic.

The illustrated embodiment assumes a basic situation in which a RAN-App is running on a physical compute host 6 compute resource node A in a CRAN data center 5. Packet flow rules are installed on the switches 7 in the data center 5 (and possibly on the path from the base station 8 to the data center 5) to forward the packets belonging to that RAN-App to node A. Due to a change in the load situation or because a co-processing opportunity presents itself, the process is to be migrated to another physical compute host 6 compute resource node B either in the same data center 5 or in a different one.

As will be appreciated by those skilled in the art, the migration itself is not necessarily a complete instance in the sense of a virtual machine (VM), but might be on a finer granularity level, i.e., a processing thread or function of an individual user within a larger VM or container. What is actually migrated is the state of a user decoding/encoding functionality. This does not reduce the generality of the approach, since the possibility to move individual user processing enables the migration of complete VMs containing a set of user processes as well.

Referring now to FIG. 2 in more detail, this figure shows an embodiment of migrating the processing (encoding/decoding) in a RAN-App running originally on physical host A. In a first step, a new instance of the RAN-App is started on physical host B and possibly given a basic configuration (e.g., channel characteristics). For instance, the starting of this new instance of the RAN-App may be triggered by a CRAN orchestrator 9 (who is generally in charge of scheduling processes and placing them on compute resources).

The traffic destined for the RAN-App that is to be migrated from node A to node B is duplicated on a network element 7 on the path from the source to node A, with the duplicated traffic being forwarded to B, such that both nodes A and B receive the traffic in parallel for a defined amount of time (for instance based on RAN protocol and frame duration as well as SDN rule installation time).

Node B starts processing the payload of that received traffic until it reaches the same state as the instance of the RAN-App being executed by node A. This is possible in the context of RAN processing since the 'memory' of a RAN-App with respect to processing has a length of only a few frames (basically accounting for HARQ, Hybrid Automatic Repeat Request). Thus, a guard or warm-up interval $t_{WU}$ can be defined (as will be described in more detail below in connection with FIG. 3) after which the new RAN-App instance produces the same output as the old one. During this warm-up phase $t_{WU}$, it proves to be beneficial that the new RAN-App instance is aware that it is warmed up, i.e., it should react differently to errors (i.e. more tolerant) when processing packets. Also, during this warm-up phase $t_{WU}$ the output of the new RAN-App instance is silently discarded, which can be implemented in the network as well.

Once the same state has been reached on the two RAN-App instances, i.e., after the interval $t_{WU}$, the new instance considers itself to be 'live', i.e., it processes frames in normal operation mode, including the reaction to errors. The output of the new RAN-App is now forwarded (together with the output of the original RAN-App instance executed on node A) to the next higher layer, e.g. to CRAN orchestrator 9, where duplicates (one from the old and one from the new instance) are resolved or can be eliminated by known techniques for packet de-duplication.

After another guard interval $t_{DO}$, the output from the old instance is no longer forwarded and silently discarded, and no new content is forwarded to the old instance. The length of this second interval is based on the estimated time for updating rules on the relevant switches, in order to avoid the loss of packets. The old instance can then be shut down, and the migration is complete.

The procedure described above can be most suitably applied for stateless connections and connection endpoints such as envisioned for CRAN, and it is possible since the duplicate response traffic can be filtered by higher layers in the case of a RAN-App. It is a significant advantage of the described embodiment that there is no time interval without a rule installed on the switch or the switches that match and forward the incoming packets, so that the packet flow is uninterrupted from the perspective of both node A and node B (once it starts). Even if the exact point in time when the new rules are applied cannot be determined with 100% accuracy, it has no detrimental effect on the packet flows, since only the sequence is important if the overlap period during which packets are duplicated is long enough.

Another important benefit of the approach is that due to the intervals with 'overlapping', i.e. duplicated processing, the lack of control over when exactly traffic is re-routed to the new instance does not matter. The practical problem of determining a specific time for the route change and implementing it on the network elements is circumvented. No middlebox buffering of the traffic is needed.

Hereinafter, with making reference again to FIG. 2, a specific embodiment will be described in which SDN forwarding rules with priorities (as specified e.g. in OpenFlow) are used to implement the duplication and phasing out.

In a first step, the scheduler responsible for placing processes on compute resources, e.g. CRAN orchestrator 9 depicted in FIG. 2, boots a VM/application on physical compute host B for running the RAN-App, if not already up.

An SDN controller 10 is notified via its northbound interface when VM/App is up and running. The SDN controller 10 installs new rules on all switches on the path between the switch 7 where the path from the RAN to host A diverges from the path from the RAN to host B (which, commonly, will be within the centralized processing/data center 5), and on host B itself. These rules match all the packets to be routed to host B that were before routed to host A only.

In particular, the SDN controller 10 installs a new (OpenFlow) rule on the switch 7 where the path from the RAN to host A diverges from the path from the RAN to host B. As already mentioned above, this switch 7 should be within the data center 5, if host A and host B are located in the same data center 5, and should be within the network from the base station 8 to the respective data centers 5 where hosts A and B are located, otherwise. This rule, which matches all the packets to be routed to host B that were before routed to host A only, has as its actions forwarding incoming matched packets to host A and to host B. It has assigned a priority higher than the priority assigned to any rule sending traffic to host A. For instance, if the priority assigned to rules forwarding traffic to host A is denoted p1, the priority of the new rule forwarding the traffic to host A and to host B may be denoted p3, with p1<p3. This new rule has a hard timeout that is the sum of the warm-up interval for the instance on host B and the guard interval for the teardown of the connection to the instance on host A, i.e. $t_{WU}+t_{DO}$.

In addition, and only after step 3 has successfully completed, the SDN controller installs a rule with the same matching criteria, but having a priority p2, p1<p2<p3, and with action 'forward packets to B'.

Similar to steps 4 and 5, new rules are installed to forward traffic from host B to the recipient of the encoded/decoded data that is the output of the new instance on host B. The rule with the higher priority simply drops the packets and needs to be installed only on the first network element on the path. It also has a hard timeout equal to the duration of the warm-up phase of B, $t_{WU}$. The rule with the lower priority is installed on all network elements on the path and will be the permanent one used after the migration.

Host B starts processing packets when the first full frame that can be decoded is received (decoders are already implemented to match these packets, e.g., when CPRI is used). During the warm-up phase, errors caused by missing state on host B are gracefully handled.

After the duplicate-forwarding rule from step 4 times out, host A no longer receives packets and will stop processing when its buffer is empty. Since this buffer is limited and thus an upper bound for this interval can be calculated, host A can be rescheduled or shut down after this short grace period. The migration is thus complete.

Figure 3:
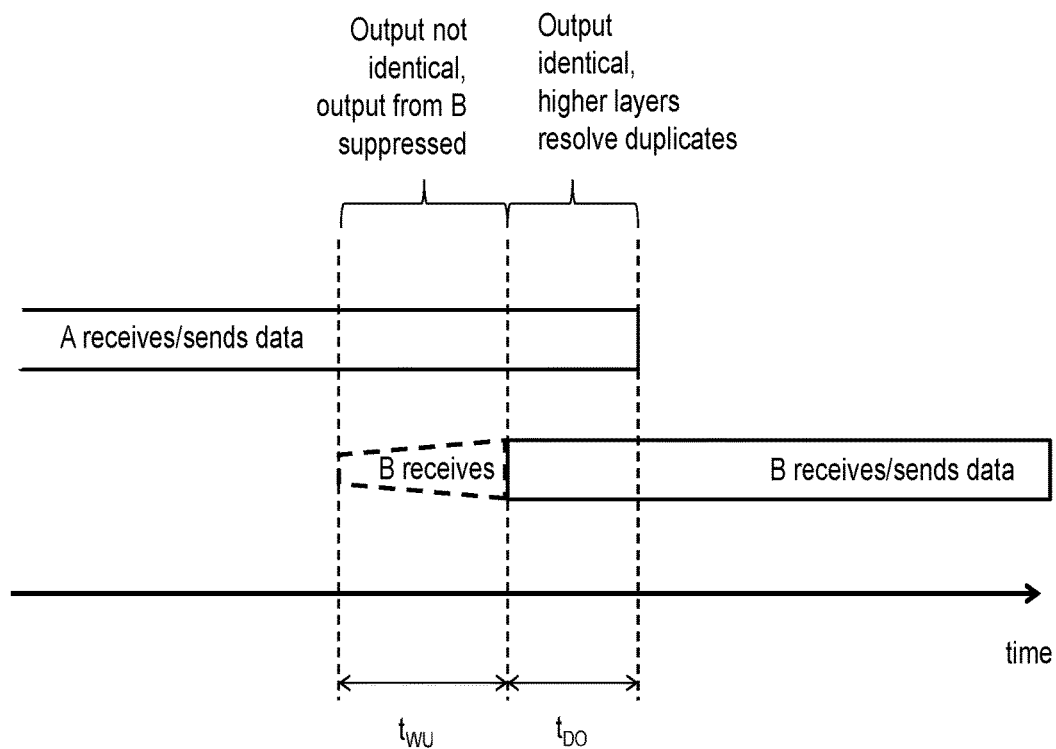
FIG. 3 is a schematic view illustrating the different time phases of a RAN App migration in accordance with an embodiment of the present invention.

FIG. 3 is a schematic view illustrating the different time phases of a RAN App migration in accordance with an embodiment of the present invention. Initially, a CRAN process is executed on a first physical compute host, i.e. host A. Consequently, only host A receives the corresponding data to be processed and sends the output data to one or more nodes processing the higher protocol layers of the user connection (where 'higher protocol layers' refers to the layers in the protocol stack above the decoding/encoding).

At the certain point in time, indicated by the vertical dashed line on the left side of FIG. 3, a second instance of the CRAN process being executed on host A, is started on a different physical compute host, i.e. host B. The traffic to be processed is duplicated, such that it is received by both hosts A and B in parallel. However, at the beginning the outputs of both instances are not yet identical. Therefore, the output from host B is suppressed.

A warm-up phase, indicated by $t_{WU}$, is specified to have a length after which it is guaranteed or can at least be assumed that both outputs are identical. Therefore, after this time interval the outputs of both instances are transmitted in parallel to higher layers (where they are resolved). In addition, another time interval is started, indicated by $t_{DO}$, which can be used to update rules on the relevant switches, in order to avoid the loss of packets. After this guard interval $t_{DO}$, the output from the old instance, i.e. host A, is no longer forwarded and silently discarded, and no new content is forwarded to the old instance.

With respect to the warm-up interval $t_{WU}$, one option is to let this value be configured in the SDN controller by the processing apps themselves, possibly via the CRAN orchestrator, utilizing the available domain-specific knowledge. A more general alternative would be to route the output of both instances via an additional entity, which is able to identify associated pairs of packets and can verify that the produced output is indeed the same. This entity can then trigger the next phase, i.e. guard interval $t_{DO}$, replacing an automated timer.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for performing centralized radio access network (CRAN) process migration in a CRAN, wherein the CRAN comprises a number of remote radio access points and a centralized processing center including a number of physical compute hosts that perform at least part of a radio access network (RAN) functionality, wherein the method comprising:
    executing a CRAN process on a first of the physical compute hosts and starting a new instance of the CRAN process on a second of the physical compute hosts,
    duplicating traffic destined to the CRAN process to both instances of the CRAN process,
    during a first time interval, processing the traffic on the first and the second physical compute host in parallel and suppressing the output of the second physical compute host, and
    when the second physical compute host reaches a same state with respect to the CRAN process as the first physical compute host, forwarding duplicate outputs from both instances to higher layers.

2. The method according to claim 1, wherein the CRAN process includes a processing thread and/or function of an individual user.

3. The method according to claim 1, wherein the new instance of the CRAN process, upon being started, is initialized with a basic configuration.

4. The method according to claim 1, wherein the first time interval is defined based on an employed RAN protocol, frame duration and/or SDN rule installation time.

5. The method according to claim 1, wherein, during the first time interval after starting the new instance of the CRAN process, the second physical compute host operates with an enhanced error tolerance.

6. The method according to claim 1, wherein the duplicate outputs from both instances are resolved at the higher layers by means of applying packet de-duplication techniques.

7. The method according to claim 1, wherein the forwarding of the output of the instance of the CRAN process executed on the first physical compute host to higher layers is stopped after a second defined time interval following the first time interval.

8. The method according to claim 1, wherein the instance of the CRAN process executed on the first physical compute host is shut down after a second defined time interval following the first time interval.

9. The method according to claim 7, wherein the length of the second time interval is determined based on an estimated time duration required for updating forwarding rules on network elements involved in forwarding traffic to be processed by the first and the second physical compute host.

10. The method according to claim 1, wherein the duplicating traffic destined to the CRAN process performed using Software Defined Networking (SDN) rules on a network element on a path from a traffic source towards the first physical compute host.

11. The method according to claim 1, wherein a CRAN process migration procedure is triggered by a CRAN process scheduler component that is in charge of placing CRAN processes on physical compute hosts.

12. The method according to claim 1, wherein an SDN controller, upon receiving a trigger message from a CRAN process scheduler component, installs new forwarding rules on all switches on a path between a switch where the path from the RAN to the first physical compute host diverges from a path from the RAN to the second physical compute host.

13. A centralized radio access network (CRAN), comprising:
    a number of remote radio access points, and
    a centralized processing center including a number of physical compute hosts configured to perform at least part of a radio access network (RAN) functionality,
    a CRAN process scheduler component configured to start, while a CRAN process is being executed on a first of the physical compute hosts, a new instance of the CRAN process on a second of the physical compute hosts and to trigger duplication of traffic destined to the CRAN process to both instances of the CRAN process,
    wherein the first and the second physical compute host are configured to process the received traffic in parallel and to suppress output of the second physical compute host during a first time interval, and to forward duplicate outputs from both instances to higher layers, when the second physical compute host reaches a same state with respect to the CRAN process as the first physical compute host.

14. The network according to claim 13, further comprising an SDN controller configured to install, upon receiving a trigger message from the CRAN process scheduler component, new forwarding rules on all switches on a path between a switch where a path from the RAN to the first physical compute host diverges from a path from the RAN to the second physical compute host.

15. The network according to claim 13, wherein the first physical compute host is configured to terminate its instance of the CRAN process after a second defined time interval following the first interval.

* * * * *